United States Patent [19]

Ito et al.

[11] Patent Number: 5,725,384
[45] Date of Patent: Mar. 10, 1998

[54] QUESTIONNAIRE AGENCY SYSTEM AND METHOD FOR CONDUCTING QUESTIONNAIRE ON PEOPLE WHO MEET CONDITIONS

[75] Inventors: Tomiko Ito; Ryoichi Ishibashi, both of Kanagawa, Japan

[73] Assignee: Fujitsu Limited, Kanagawa, Japan

[21] Appl. No.: 589,851

[22] Filed: Jan. 22, 1996

[30] Foreign Application Priority Data

Apr. 24, 1995 [JP] Japan ................................. 7-098786

[51] Int. Cl.$^6$ ................................................. G09B 3/00
[52] U.S. Cl. ........................................ 434/350; 434/322
[58] Field of Search .................................. 434/350, 322

[56] References Cited

U.S. PATENT DOCUMENTS

| | | | |
|---|---|---|---|
| 4,845,739 | 7/1989 | Katz | 379/92 |
| 5,377,258 | 12/1994 | Bro | 379/93 |

*Primary Examiner*—Richard J. Apley
*Assistant Examiner*—John E. Rovnak
*Attorney, Agent, or Firm*—Helfgott & Karas, P.C.

[57] ABSTRACT

A questionnaire agency company stores individual information of a number of answerers in a database in a questionnaire agency system. When a client enters desired conditions, answerers who meet the conditions are retrieved automatically. The number of the answerers is presented to the client. When the client approves it, the contents of a questionnaire are sent to the chosen answerers by telephone or facsimile and replies to the questionnaire are collected.

21 Claims, 11 Drawing Sheets

| NUMBER | ATTRIBUTE A | ATTRIBUTE B | ATTRIBUTE C | FAX NO. (SUBSCRIBER ID) | NUMBER OF REPLIES |
|---|---|---|---|---|---|
| 1 | A1 | B1 | C1 | △△△-×××-○○○○ | N1 |
| 2 | A2 | B2 | C2 | △△△-□□□-◇◇◇◇ | N2 |

FIG. 4

| NUMBER | COMPANY NAME | FAX NO. (SUBSCRIBER ID) | NUMBER OF REQUESTS |
|---|---|---|---|
| 1 | AAA | xxx-ooo-□□□□ | M1 |
| 2 | BBB | ooo-△△△-xxxx | M2 |

QUESTIONNAIRE AGENCY SYSTEM AND METHOD FOR CONDUCTING QUESTIONNAIRE ON PEOPLE WHO MEET CONDITIONS

BACKGROUND OF THE INVENTION

1. Field of the Invention

The present invention relates to a questionnaire agency system and method for conducting questionnaire as requested by a client, and collecting replies from answerers.

2. Description of the Related Art

Nowadays companies and organizations frequently conduct questionnaire on unspecified individuals. In order for a company to conduct questionnaire on a matter, it is necessary to retrieve people or households that meet desired conditions in advance, by some method. However, there is no practical system for retrieving relevant answerers. In the case of questionnaire by phone or FAX, an operator will have to dial each answerer to receive replies. Thus, the more the number of answerers increases, the more man power and time will be required. If, on the other hand, answerers are directly asked by a company for cooperation to questionnaires etc . . . , there arises the fear of violating their privacy.

SUMMARY OF THE INVENTION

It is an object of the present invention to provide a questionnaire agency system and method for intermediating between a questionnaire client and questionnaire answerers, automatically executing desired questionnaire for the client and reporting the results to the client.

A questionnaire agency system of the present invention comprises a communication unit, a database unit, an input/output unit, an information retrieval unit, a distribution unit, and a collection unit.

The database unit stores answerer information which is individual information about of a number of answerers. The input/output unit inputs conditions for answerers specified by a client. The information retrieval unit retrieves answerers who meet the specified input conditions from among the answerer information in the database unit. The answerer information includes attributes of each answerer such as sex, age, address, etc. By specifying desired attributes, a client can automatically obtain a list of candidates for questionnaire who have the specified attributes.

The client is informed of the number of answerers who meet the specified input conditions. The answerer information stored in the database unit is not disclosed to clients, which prevents individual information about the answerers from being leaked to a client.

Moreover, the database unit stores call numbers of answerers' terminals, such as telephones, facsimiles, etc., as answerer information. The communication unit sends the contents of a questionnaire to answerers using the call numbers of candidates for the questionnaire chosen by the information retrieval unit, and receives replies to the questionnaire. The communication unit automatically conducts questionnaire and collects replies thereto, significantly alleviating the burden imposed on an operator.

Furthermore, the database unit stores a correspondence relationship between the identifers of candidates for questionnaire and the identifier of a client and the call number of a client's terminal. The distribution unit chooses answerers who are requested to correspond with the client, as locations to which a questionnaire is distributed, and directs the communications unit to distribute the questionnaire to these answerers. A correspondence is established between a specific client and one or more answerers in advance. Thus, various questionnaires from the client can be sent to the same answerers repeatedly. The collection unit directs the communication unit to transfer replies from the answerers to the terminal of the client. This permits the collected replies to be sent to the client automatically.

BRIEF DESCRIPTION OF THE DRAWINGS

FIG. 4 shows an example of answerer information;

FIG. 5 shows an example of client information;

DETAILED DESCRIPTION OF THE PREFERRED EMBODIMENTS

Figure 1:
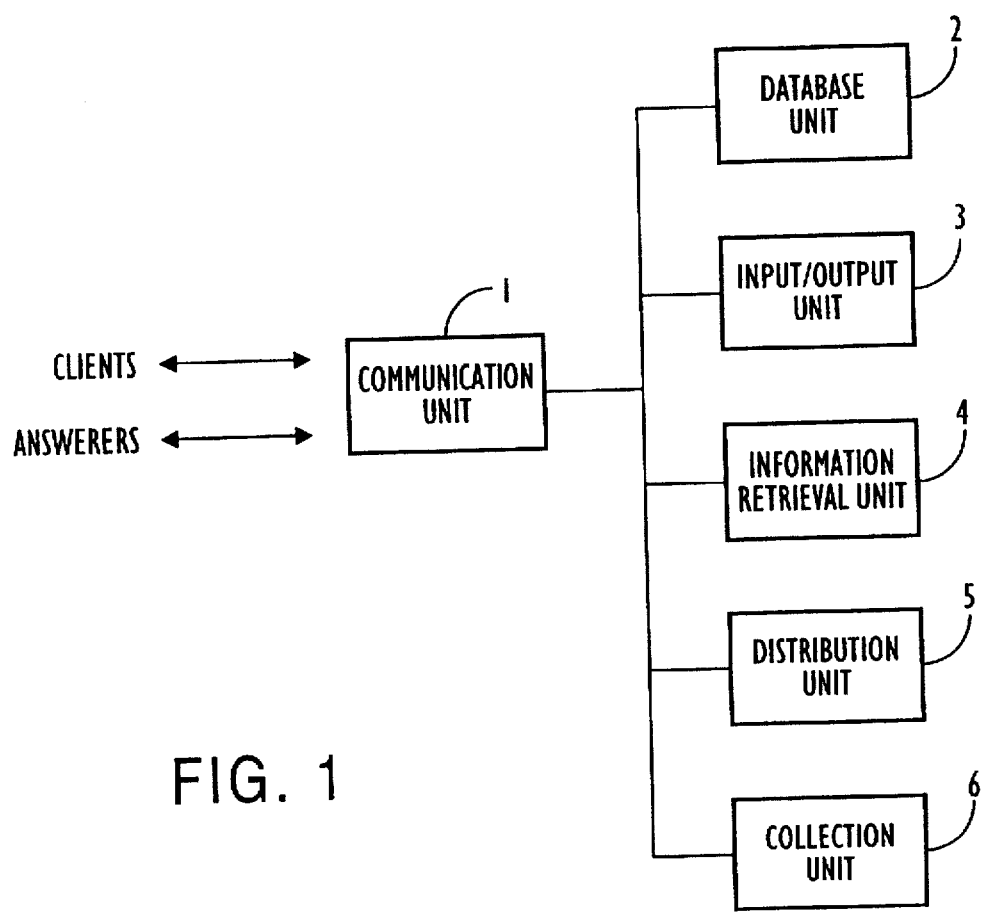
FIG. 1 is a simplified block diagram illustrating the basic configuration of a questionnaire agency system of the present invention.

FIG. 1 shows the basic configuration of a questionnaire agency system of the present invention, which comprises a communication unit 1, a database unit 2, an input/output unit 3, an information retrieval unit 4, a distribution unit 5, and a collection unit 6.

The database unit 2 stores answerer information including individual information about a number of answerers. The input/output unit 3 inputs conditions for answerers specified by a first client. The information retrieval unit 4 compares the individual information of each answerer included in the answerer information with the specified conditions, to automatically retrieve first answerers who meet the specified conditions.

The answerer information stored in the database unit 2 contains call numbers of the terminals of the answerers. The information retrieval unit 4 reads the call numbers of the first answerers from the database unit 2.

The communication unit 1 receives the contents of a questionnaire from the terminal of the first client and then sends the questionnaire to the first answerers' terminals, which are called by the call numbers read by the information retrieval unit 4. Then, the communication unit 1 receives replies to the questionnaire from the first answerers.

The database unit 2 also stores the answerer information containing identifiers of a number of answerers, and client information containing identifiers of a number of clients. The information retrieval unit 4 retains the identifiers of the first answerers so that they are made to correspond with the identifier of the first client.

The distribution unit 5 identifies the terminal of the first client that transmitted the questionnaire contents to the communication unit 1, and chooses from among answerers included in the answerer information the first answerers having identifiers which have been made to correspond with the identifier of the first client as destinations of the questionnaire contents.

The collection unit 6 controls the communication unit 1 to transfer replies to the questionnaire to the terminal of the first client.

Figure 6:
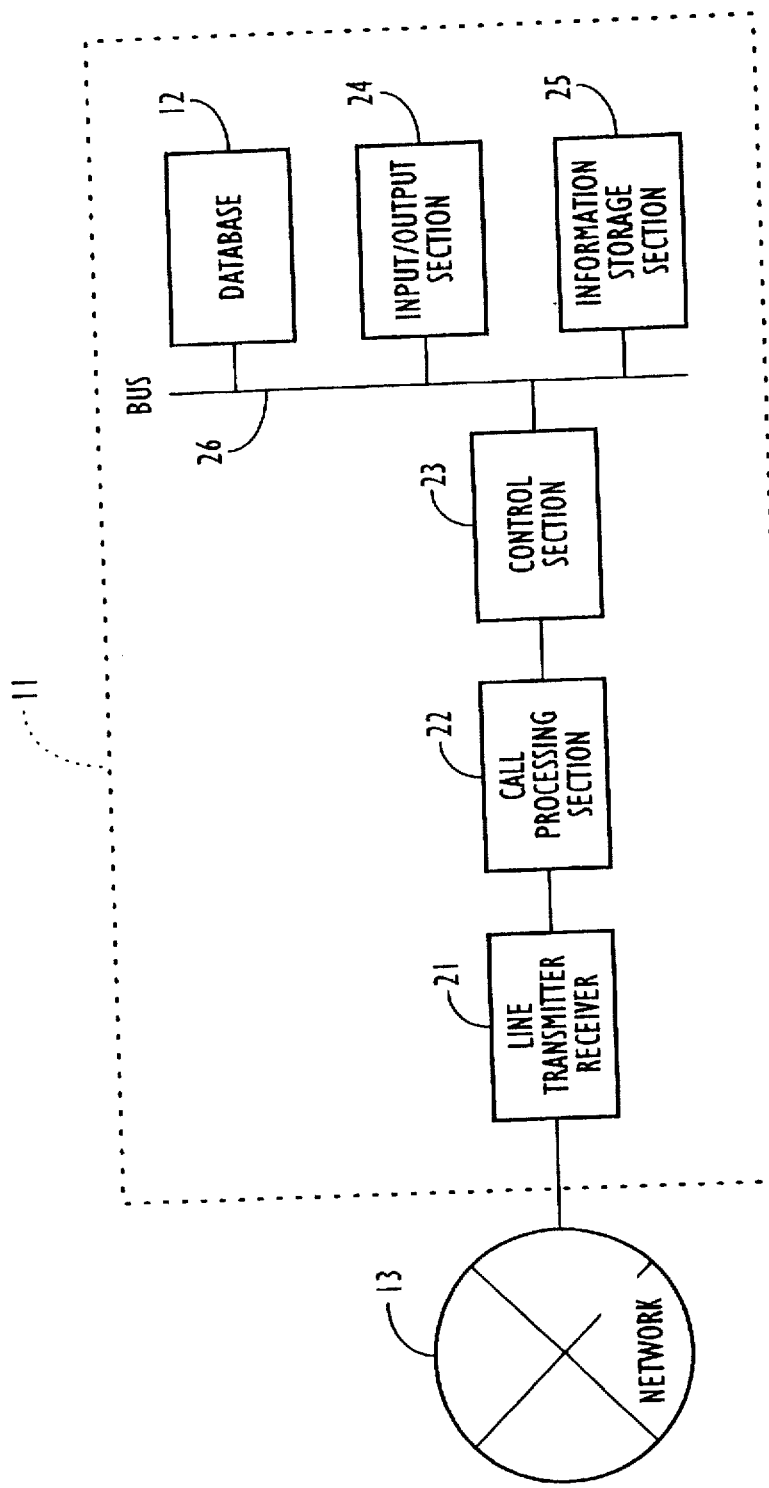
FIG. 6 is a block diagram of the retrieval unit of FIG. 3.

The communication unit 1 of FIG. 1 corresponds to a line transmitter/receiver 21 and a call processing section 22 of FIG. 6. The database unit 2 corresponds to a database 12 of FIG. 6 or a database 32 of FIG. 11. The input/output unit 3 corresponds to an input/output section 24 of FIG. 6. The information retrieval unit 4, the distribution unit 5 and the collection unit 6 correspond to a control section 23 of FIG. 6. The identifiers of answerers that the database unit 2 stores correspond to numbers in the first column of the answerer information of FIG. 4, and the identifiers of clients correspond to numbers in the first column of the client information of FIG. 5. Each of the clients and answerers may be a company, an organization or an individual. Terminals of clients and answerers include facsimiles (FAX) and telephones. In this case, the call number of each terminal corresponds to the FAX number or the telephone number.

The provision of the database unit 2 that stores individual information of a number of answerers as answerer information makes it possible to choose answerers that meet conditions specified by a client when the client makes a request for questionnaire. The information retrieval unit 4 searches the database unit 2 for answerers having individual information that meets the conditions entered from the input/output unit 3. On the basis of the results of the search, the client is able to determine whether to make a request for questionnaire.

The answerer information stored in the database unit 2 contains call numbers of answerers' terminals, which permits the information retrieval unit 4 to read the call numbers of answerers who meet the specified conditions.

Using one or more answerers' call numbers read by the information retrieval unit 4, the communications unit 1 automatically sends the contents of a questionnaire to the terminals of the relevant answerers. It then receives replies to the questionnaire from their terminals. Even when a large number of answerers who meet the conditions is retrieved, the communication unit 1 automatically sends the contents of the questionnaire to the terminal of each answerer, eliminating the need for manpower and permitting questionnaire to be conducted promptly.

The answerer information contains answerers' identifiers, and the database unit 2 stores client information containing clients' identifiers in addition to the answerer information. The information retrieval unit 4 reads the identifiers of answerers who meet the conditions and then associates those answerers' identifiers with the identifier of a client who specified the conditions. When a client makes a request for questionnaire and sends the contents of a questionnaire, the distribution unit 5 can refer to those identifiers to choose answerers who are associated with the client as candidates to whom the contents of the questionnaire are to be distributed.

Under the control of the collection unit 6, a reply to the questionnaire from the terminal of each answerer is automatically transferred to the terminal of the relevant client, thereby eliminating the need for distributing replies to the questionnaire by manpower.

Figure 2:
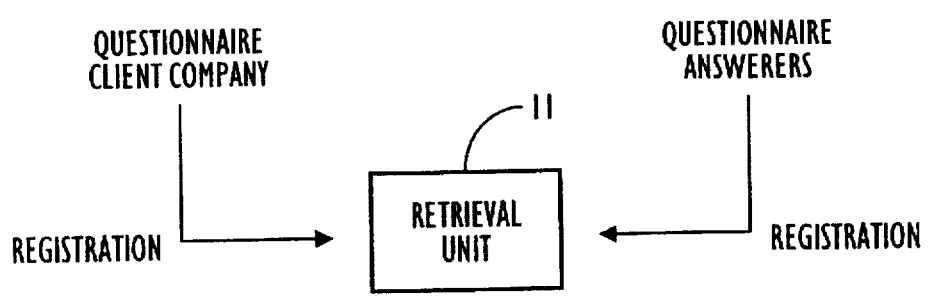
FIG. 2 shows a relationship between a requesting company and an answerer.

FIG. 2 shows a relationship between questionnaire requesting companies and answerers in the questionnaire agency system of an embodiment of the present invention.

The present embodiment is intended to reduce manpower-based work and perform surveys for companies by using the retrieval unit 11 supporting a questionnaire agency service. Questionnaire requesting companies have been entered into the retrieval unit 11 installed in a questionnaire agency company in advance. When a company desires to make a survey, it simply makes a request to the retrieval unit 11 for that survey. Cooperative answerers have also been entered into the retrieval unit 11 in advance.

Figure 3:
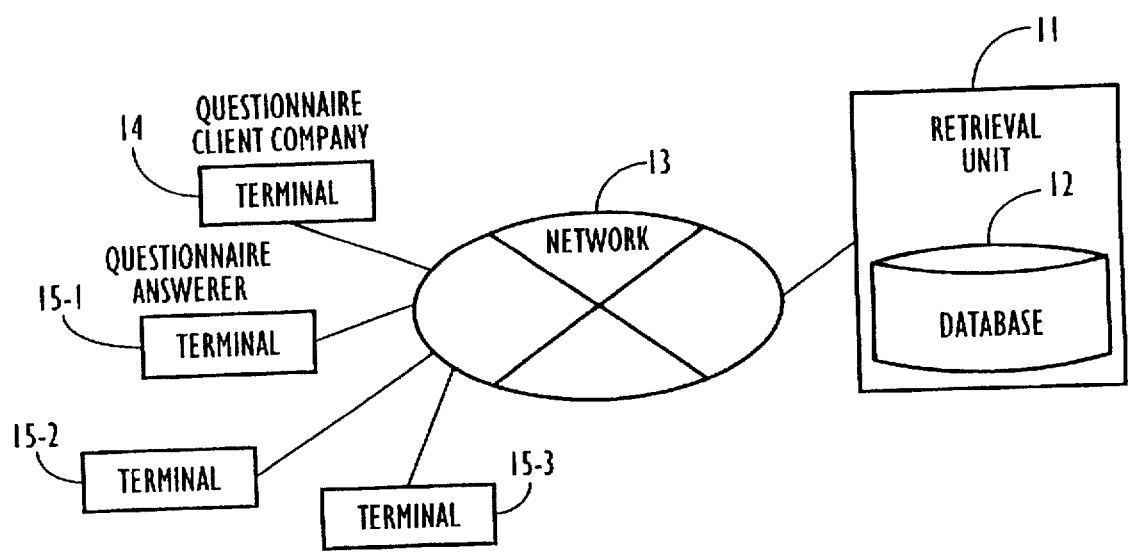
FIG. 3 shows a first configuration of the questionnaire system of the present invention.

FIG. 3 shows a first configuration of the questionnaire agency system of the present embodiment. The system of FIG. 3 comprises a retrieval unit 11, a network 13, and terminals 14, 15-1, 15-2 and 15-3. The terminal 14 is the terminal of a questionnaire requesting company and terminals 15-1, 15-2 and 15-3 are the terminals of answerers. Examples of terminals include telephones, facsimiles, and computer terminals. Although, in FIG. 3, one questionnaire requesting company's terminal and three answerers' terminals are indicated, an arbitrary number of terminals can be generally connected to the network for companies and answerers.

The retrieval unit 11 has a database 12 connected to an exchange (not shown) that the network accommodates. The database 12 is constructed from two types of databases: a database that stores answerer information, and a database that stores client information. The answerer information, which is individual information about answerers, contains identifier information of answerers and many types of attributes. The client information is information about questionnaire requesting companies.

FIG. 4 shows an example of answerer information stored in the database 12. The answerer information of FIG. 4 has a data structure in the form of a table and contains fields of answerer number, answerer attributes A, B, C, etc., subscriber identifier (ID), and the number of replies. The answerer attributes represent individual information such as sex, age, family make-up, annual income, address, etc. The subscriber ID represents identification information of each answerer registered in the questionnaire agency system. In FIG. 4, the FAX number is registered as the subscriber identifier. The number of replies represents the number of replies to questionnaires the relevant answerer has given so far. In FIG. 4, the values of attributes A, B and C of the answerer numbered 1 are A1, B1 and C1, respectively, the FAX number is "△△△-xxx-○○○○" and the number of replies is N1. Likewise, the values of attributes A, B and C of the answerer numbered 2 are A2, B2 and C2, respectively, the FAX number is "△△△-□□□-◇◇◇◇", and the number of replies is N2.

FIG. 5 shows an example of client information stored in the database 12. The client information also has a data structure in the form of a table, and contains fields of client number, company name, subscriber ID, and the number of requests. The company name represents the name of a requesting company, and the subscriber ID represents client identification information registered in the questionnaire agency system. In FIG. 5, the registered FAX number is used as the subscriber ID. The number of requests represents the number of requests for questionnaire the corresponding client has made so far.

In FIG. 5, the company name of the client numbered 1 is AAA, the FAX number is xxx-○○○-□□□□, and the number of requests is M1. Likewise, the company name of the client numbered 2 is BBB, the FAX number is ○○○-△△△-xxxx, and the number of requests is M2.

Upon receipt of a specific attribute of candidates for a questionnaire, the retrieval unit 11 retrieves from the database 12 the FAX numbers of answerers who meet that attribute. Next, the retrieval unit randomly extracts a required number of FAX numbers from the FAX numbers retrieved and automatically calls the extracted subscribers for questionnaire. For questionnaire not by FAX but by telephone, telephone numbers—not FAX numbers—are registered as subscriber IDs FIG. 4. In this case as well, answerers are called automatically by the use of telephone numbers extracted. Also, telephone numbers may be used as subscriber IDs of clients in FIG. 5.

When a requesting company is registered in the questionnaire agency system, client information, such as the number of requests, is stored in the database 12. The number of requests is updated each time the requesting company makes a request for questionnaire. The requesting company pays a fee on the basis of the updated number of requests. Likewise, the number of replies received is updated each time the corresponding answerer makes a reply to a questionnaire. Each answerer is rewarded on the basis of the updated number of replies.

FIG. 6 is a block diagram of the retrieval unit 11 of FIG. 3, which comprises a line transmitter/receiver 21, a call processing section 22, a control section 23, a database 12, input/output section 24, and an information storage section 25. The control section 23, the database 12, the input/output section 24 and the information storage section 25 are interconnected by a bus 26.

The database 12 stores answerer information and client information. The input/output section 24 is, for example, a terminal equipped with a keyboard and a display and is used to enter or update answerer information about answerers who can cooperate in questionnaire and client information about companies that make requests for questionnaire. The information is entered into the database 12 and updated as required. The information storage section 25 is a memory which temporarily stores the contents of actual questionnaires. The call processing section 22 performs call and transfer processing as requested by the control section 23 and processes incoming calls from requesting companies and answerers. The line transmitter/receiver 21 receives signals from the network 13 and transmits signals to the network 13. The control section 23, which is, for example, a processor which executes a program for the questionnaire agency system, controls each section of the retrieval unit 11.

Figure 7:
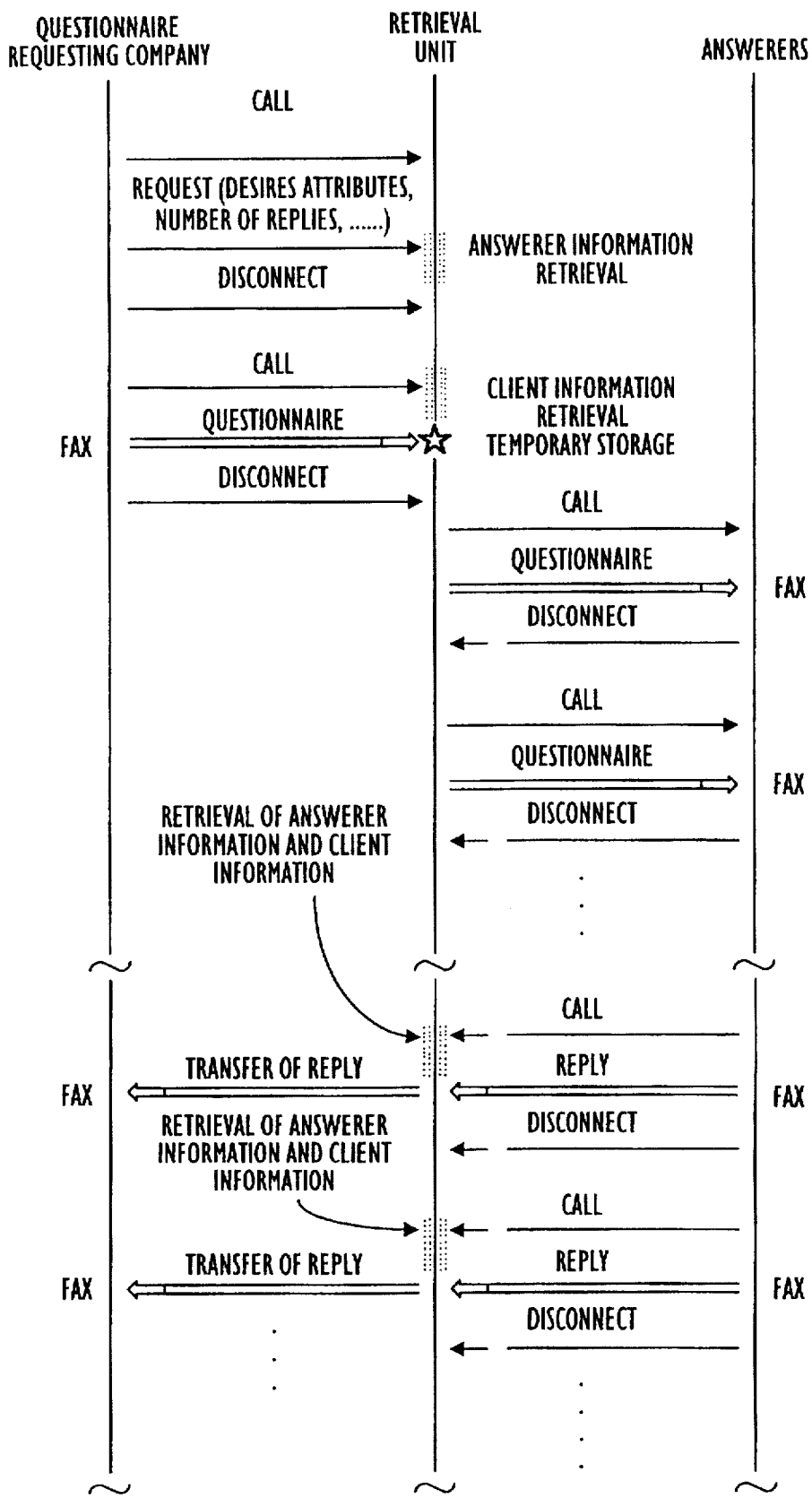
FIG. 7 shows an example of a questionnaire sequence by FAX.

FIG. 7 shows an example of a questionnaire sequence by FAX. Assume here that information about questionnaire requesting companies and answerers cooperative in answering questionnaires has been already registered. First, a questionnaire requesting company sends desired answerer attributes, number of answerers (the number of questionnaires) and so on, from the terminal 14 over the network 13 to the retrieval unit 11 to make a request for a questionnaire. The retrieval unit 11 searches answerer information in the database 12 and informs the requesting company of the number of answerers who meet the desired attributes. The requesting company verifies this and then sends the contents of the questionnaire to the retrieval unit 11.

The retrieval unit 11 temporarily stores the questionnaire contents sent, in the information storage section 25. At this point, the retrieval unit 11 retrieves the requesting company data from the database 12 and updates the number of requests for questionnaire that have been received from that company. Then, the retrieval unit 11 sequentially sends the stored questionnaire contents and the requesting company number associated with the requesting company to the terminals 15-1, 15-2, 15-3, and so on of answerers randomly extracted from the answerers who meet the desired attributes. The requesting company number may be a number indicated in the first column of the client information of FIG. 5. The transmission of the contents of the questionnaire is repeated until the number of questionnaire requested by the requesting company is reached.

Each answerer who received the contents of the questionnaire sends a reply to the questionnaire including the requesting company number to the retrieval unit 11. Upon receipt of the reply, the retrieval unit 11 retrieves client information on the basis of the requesting company number, reads the FAX number of the requesting company, and transfers the reply to the questionnaire to the terminal 14 of the requesting company. The retrieval unit 11 retrieves each answerer from the answerer information and updates the number of replies that he/she has made.

The number of requests made by the requesting company may be updated after all replies to the questionnaire have been reported to the requesting company.

Next, the operation of the retrieval unit 11 will be described in more detail with reference to FIGS. 8, 9 and 10. Before making a request for questionnaire, a client company first makes a request to an operator of the questionnaire agency company by telephone, for example, for retrieval of answerer information. The operator retrieves this data using the retrieval unit 11, and informs the result to the client company. Thus, the client company can determine whether to make a request for questionnaire on the basis of the result of the retrieval.

Figure 8:
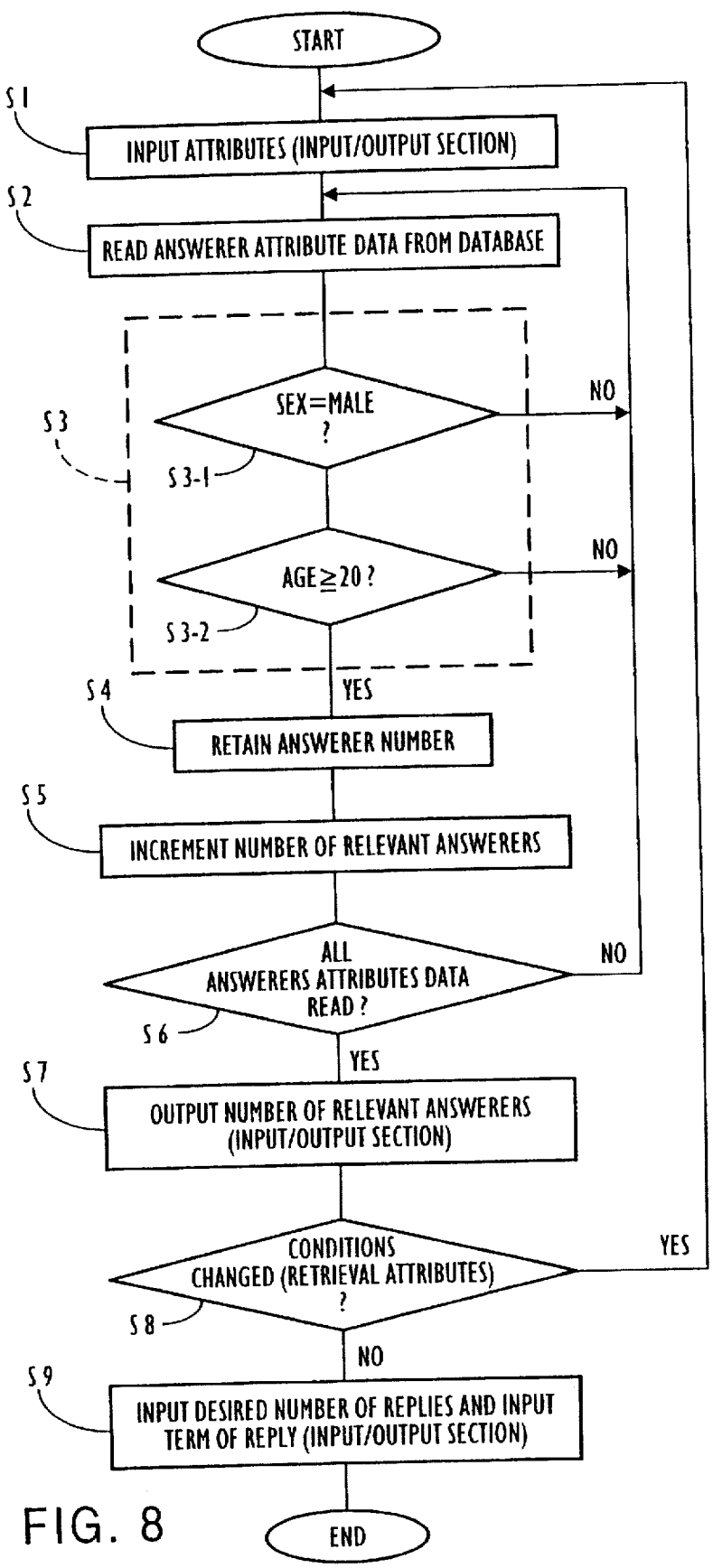
FIG. 8 is an operating flowchart for the retrieval process.

FIG. 8 is an operating flowchart for the retrieval processing when a request for retrieval of answerer information is made by a client company.

In FIG. 8, the operator of the questionnaire company first enters attribute conditions specified by the client company to the input/output section 24 (step S1). The control section 23 reads attribute data of an answerer from the answerer information in the database 12 (step S2) and checks whether that answerer meets the entered attribute conditions (step S3). If the conditions are met, then the number of that answerer is retained and is made to correspond with the client company (step S4). If the conditions are not met, then the control section reads attribute data of the next answerer (step S2).

For example, if the attribute conditions of males of twenty years old or more are entered, then a decision is first made as to whether an answerer is male (step S3-1). If so, then a decision is made as to whether the answerer is twenty years old or more (step S3-2). If so, then the number of that answerer is retained (step S4). If the conditions are not met in step S3-1 or S3-2, then the process returns to step S2 for the next answerer.

Next, the number of relevant answerers is incremented (step S5) and a decision is made as to whether attribute data has been read for all answerers (step S6). This decision can be made by checking whether the number of an answerer that was read immediately before the decision corresponds to the last number. The number of answerers has been initially set to zero before the start of the process. If answerer attribute data is left, then the process returns to step S2. If attributes data of all of the answerers has been read, then the number of answerers who meet the conditions is output to the input/output section 24 (step S7).

Next, the operator informs the client company of the number of relevant answerers by telephone, for example. The client company decides whether to change the attribute conditions on the basis of the number of the relevant answerers that meet the first attribute conditions (step S8). If the client company changes the conditions, then the operator reenters the changed attributes (step S1). In this case, the control section 23 repeats steps S2 through S7. If there is no change in the attribute conditions, then the operator enters a desired number of replies to a questionnaire and the term of the questionnaire, specified by the client company, through the input/output section 24 (step S9), thereby terminating the processing.

The retrieval unit 11 automatically retrieves the numbers of answerers who become candidates for questionnaire, reducing the time required for retrieval, and allowing the client company to change attribute conditions on the basis of the number of relevant answerers who meet the conditions.

Figure 9:
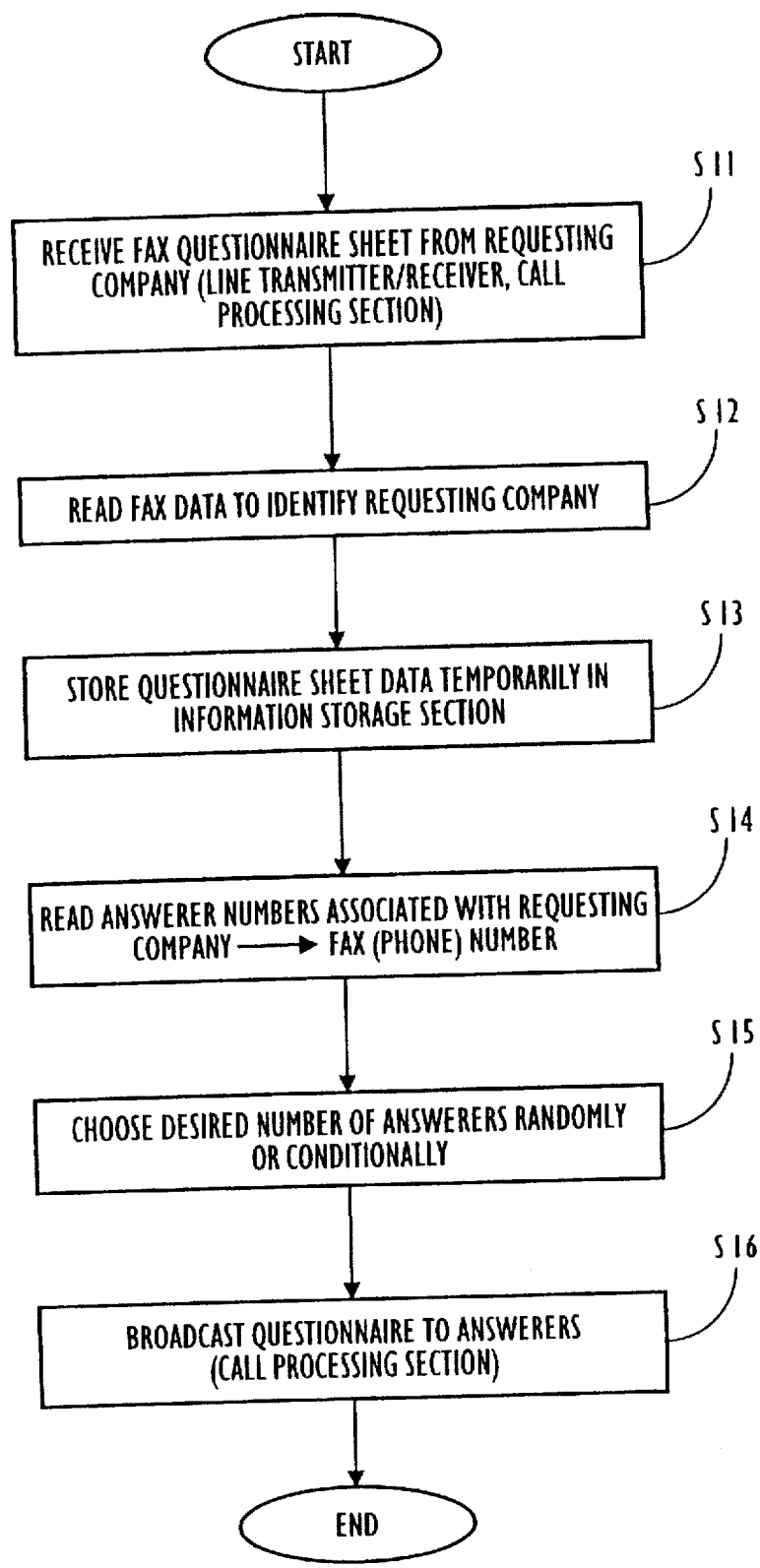
FIG. 9 is an operating flowchart for the distribution process.

FIG. 9 is an operating flowchart for distribution processing when a client company requests to conduct questionnaire.

In FIG. 9, when a client company sends a questionnaire sheet by FAX, the line transmitter/receiver 21 receives and passes it to the call processing section 22 (step S11). The call processing section 22 sends the FAX data to the control section 23.

The control section 23 reads the FAX data, then identifies the client company (step S12) and temporarily stores the data of the questionnaire sheet in the information storage section 25 (step S13). Next, the control section 23 extracts answerer numbers stored associated with the client company, and reads the FAX numbers (or telephone numbers) from the answerer information on the basis of the answerer numbers (step S14). An equal number of answerers to the desired replies are chosen (step S15). At this point, random numbers may be generated to choose answerers from among the retained answerer numbers in a random manner. Alternatively, answerers may be chosen under certain conditions. For example, it is also possible to choose answerers who have made few answers on a preferential basis. The FAX numbers of the chosen answerers are passed to the call processing section 22 together with the data of the questionnaire sheet.

The call processing section 22 broadcasts the questionnaire sheet to the answerers using the passed FAX numbers (step S16). An existing technique can be used to broadcast the same data to a number of subscribers.

Figure 10:
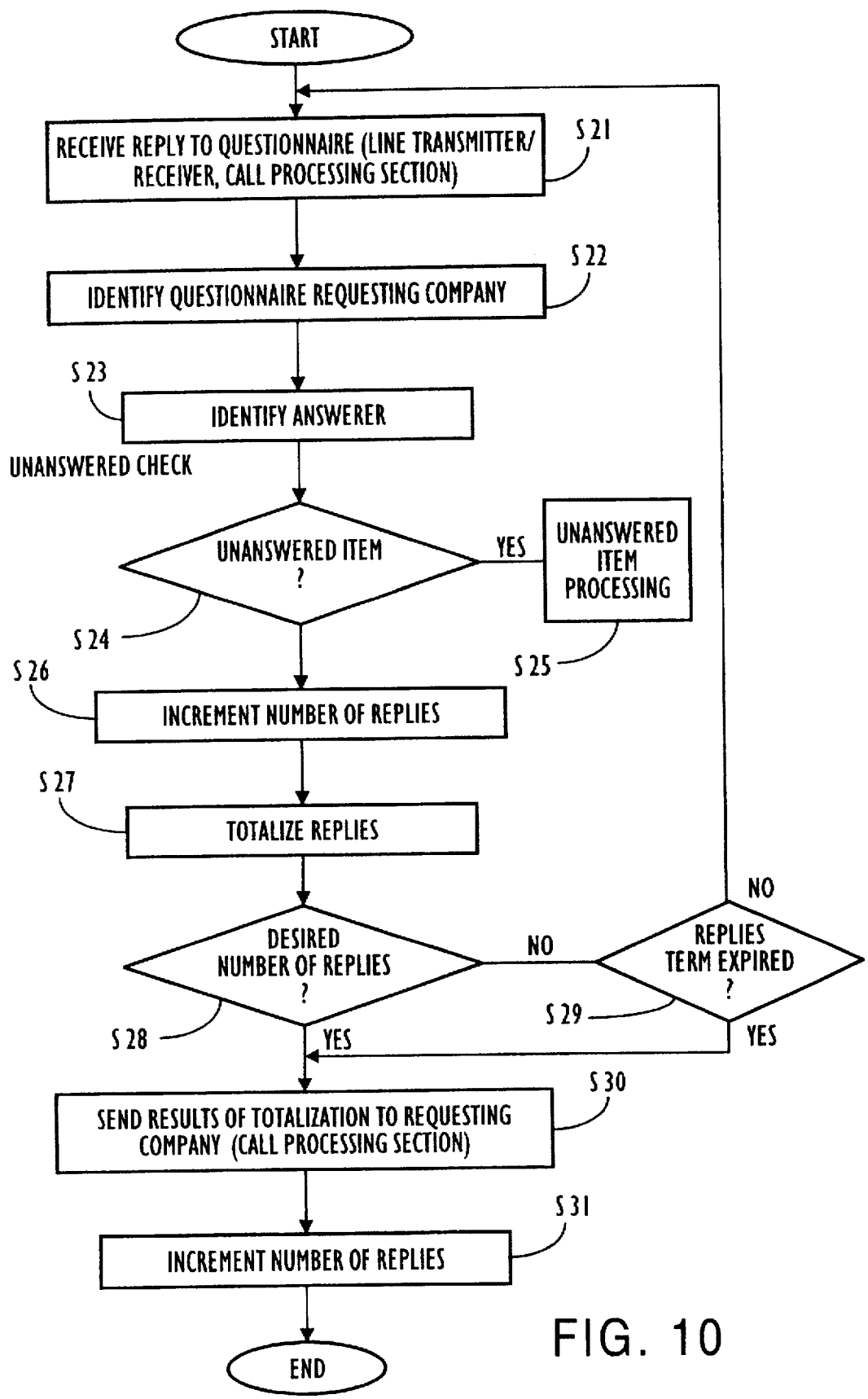
FIG. 10 is an operating flowchart for the collection process.

FIG. 10 is an operating flowchart for collection processing when replies to the questionnaire are received from the answerers.

In FIG. 10, when an answerer sends a reply to the questionnaire by FAX, the line transmitter/receiver 21 receives it and then passes it to the call processing section 22 (step S21). The call processing section 22 sends the FAX data to the control section 23.

The control section 23 reads the FAX data to identify the questionnaire requesting company and the answerer who sent the reply (steps S22 and S23). The answerer can be identified by the FAX number of the location from which the FAX was sent. Automatic identification of the requesting company is provided by the following methods.

In the case of questionnaire by FAX, an answerer faxes a reply to a FAX number specified by the agency, in the same manner as direct-dialing an extension telephone in a company. To this end, the agency simply writes the number of the location to which a reply is to be returned, ○○○-xxxx-#△△△, on the questionnaire sheet to be sent to answerers, in advance. The extension number #△△△ is associated with the company which made the request for the questionnaire. By so doing, replies to a questionnaire will arrive at one of the extensions in the agency, each of which is assigned to a different client company. Thus, the replies can be transferred to the requesting company as they are received.

Alternatively, the agency may set up the format of a questionnaire sheet for each client company and attach a client number representing a requesting company to the sheet by means of numeric characters, a bar code, a mark sheet, or the like. By reading the questionnaire sheet returned from an answerer, the requesting company can be known from the client number. Thus, the sheet can be transferred to the requesting company. If the questionnaire Sheet is in the form of a mark sheet, replies to the questionnaire are totalized and then the total results of the questionnaire are sent to the requesting company.

In this way it becomes possible to automatically distribute replies by FAX.

It is also possible to conduct questionnaire by telephone using the PB (Push Button) signals of push-button telephones. In this case, the contents of a questionnaire are sent to answerers by FAX, and answerers reply to the questionnaire by operating push-button telephones as instructed. Or, a system may be used in which, when an answerer phones the agency company, voice guidance system starts and he or she makes a reply to a questionnaire in accordance with the voice guidance. Or, a system may be used in which, when an answerer has a voice guidance call from an agency company, he or she makes an immediate reply to a questionnaire. Which type of telephone-based questionnaire is to be conducted can be determined properly according to the type of questionnaire.

When answerers make replies to a questionnaire by telephone, they are requested to enter the questionnaire number by means of PB signals. The questionnaire number has been associated with a client company in advance, and the client company can be identified by that number for the subsequent transfer of replies to the questionnaire.

In any case, a client company has only the replies transferred to it without being informed of the identity of the answerers, thereby considerably reducing the possibility that the privacy of answerers may be violated.

Next, the control section 23 makes a decision as to whether the received replies include unanswered items (step S24). With replies by FAX, a machine which can read FAX data is used to check whether marks are put or characters are written in predetermined positions on a questionnaire sheet returned from an answerer. Where a reply is made by push-button telephone, it is confirmed whether reply data from an answerer includes reply signals. If unanswered items are included, an unanswered-questionnaire process is performed to abandon the reply from that answerer or to prompt that answerer to make a reply again (step S25).

If there is no unanswered item, the answerer information is searched and the number of replies that the answerer has made is incremented by one (step S26). With a questionnaire sheet in the mark sheet form, replies to the questionnaire are totalized (step S27). The mark sheet portion of the questionnaire sheet is collected by an existing method and the descriptive portion is preserved as it is. The preserved data is updated each time one reply to the questionnaire is collected.

Next, a decision is made as to whether the desired number of replies specified by the requesting company is reached (step S28). When the desired number of replies is not reached, a decision is made as to whether the term of the questionnaire has expired (step S29). If it has not expired, steps S21 through S28 are repeated. If, on the other hand, the desired number of replies is reached in step S28, or if the term has expired in step S29, then the call processing section 22 immediately sends the results of the totalization to the requesting company (step S30). The control section 23 searches the client information in the database 12 and increments the number of requests made by the requesting company (step S31) by one, thus terminating the process.

Next, a way to create two databases for answerer information and client information will be described. For the answerer information, the agency company recruits cooperators for questionnaires by the use of an advertisement or the like, and registers the cooperators automatically. At this point, a method of registration is described in the advertisement and each cooperator enters his or her individual information accordingly. For example, when a cooperator makes replies to questions by means of PB signals in the same manner as making a reply to a questionnaire, he or she is registered automatically, thereby creating a database for the answerer information.

For client information as well, the agency company collects client companies by the use of an advertisement or the like. In the advertisement, an explanation of the material necessary for registration is described. When a company sends the material to the agency company, it is registered as a client company. The agency company creates a database for client companies on the basis of the material sent thereto.

Each of these databases may be separated into groups at the time of creation. For example, if the storage location for answerer information is separated by sex, then the time required for retrieval will be reduced when sex is one of retrieval conditions. The databases are treated by the use of an existing database creation program or the like.

The agency company asks answerers to regularly report whether there are changes to attributes and the like. If there is a change, the agency company updates the corresponding item. For changes to important information such as address, FAX number, telephone number and the like, the agency company asks answerers to report them without a delay. A report of changes is accepted over the telephone and the operator in the agency company enters change information into the retrieval unit 11 to thereby update data. It is also possible for an answerer to update his or her attribute data by means of PB signals.

Figure 11:
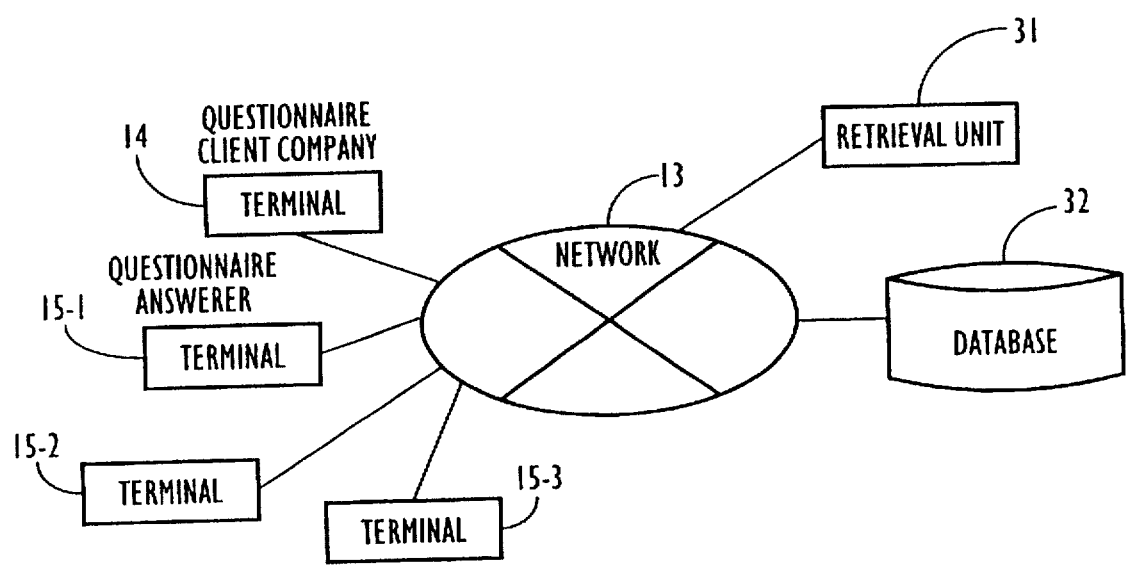
FIG. 11 shows a second configuration of the questionnaire agency system of the present invention.

FIG. 11 shows a second configuration of the questionnaire agency system. In FIG. 11, the same reference numerals are used to denote elements corresponding to those in FIG. 3. The questionnaire agency system of FIG. 11 is distinct from the first configuration in that it is equipped with a retrieval unit 31 and a database 32 which are separated from each other. The database 32 is connected to a communication exchange included in the network 13 and stores answerer information and client information, as is the case with the database 12. The retrieval unit 31, which is identical in arrangement to the retrieval unit 11 of FIG. 6 except for the database 12, executes questionnaire for client companies. The retrieval unit 31 is also identical in operation to the retrieval unit 11.

According to the present invention, questionnaire that a client desires is conducted automatically by an agency company and the results are reported by the agency company to the client. At this point, answerers who are candidates for questionnaire are retrieved automatically from a database, which permits the time required to extract answerers to be reduced. Moreover, by automatically calling answerers, the time required to conduct questionnaire can be reduced considerably. Furthermore, the agency company conducts questionnaire instead of the clients, which ensures answerers' privacy.

What is claimed is:

1. A questionnaire agency system for intermediating a questionnaire client and answerers each having a terminal connected to a network and conducting questionnaire for the client, comprising:

a database to store answerer information containing individual information about a plurality of answerers;

an input/output unit to input an answerer condition specified by a first client; and an information retrieval unit to compare said individual information of said answerers contained in said answerer information with said condition to thereby automatically retrieve a first answerer who meets said condition among said plurality of answerers, and to choose said first answerer as a receiver of a questionnaire of said first client.

2. The questionnaire agency system according to claim 1, wherein said terminal is one of a telephone and a facsimile.

3. The questionnaire agency system according to claim 1, wherein said information retrieval unit counts the number of answerers who meet said condition of said plurality of answerers contained in said answerer information, and said input/output unit outputs the number of said answerers who meet said condition.

4. The questionnaire agency system according to claim 1, wherein said database stores said answerer information containing call numbers of terminals of said plurality of answerers, and said information retrieval unit retrieves a call number of said first answerer from said database.

5. The questionnaire agency system according to claim 4, further comprising communication means for calling a terminal of said first answerer using the call number of said first answerer retrieved by said information retrieval unit and sending the contents of said questionnaire to said terminal of said first answerer.

6. The questionnaire agency system according to claim 5, wherein said communication means receives the contents of said questionnaire from the terminal of said first client and sends said contents to said terminal of said first answerer after said information retrieval unit reads said call number of said first answerer.

7. The questionnaire agency system according to claim 5, wherein said database stores said answerer information containing identifiers of said plurality of answerers and client information containing identifiers of a plurality of clients, and said information retrieval unit retains an identifier of said first answerer so that said identifier of said first answerer is made to correspond with an identifier of said first client.

8. The questionnaire agency system according to claim 7, further comprising distribution means for identifying the terminal of said first client that sent said questionnaire contents to said communication means, and for choosing said first answerer whose identifier is made to correspond with said identifier of said first client as a destination to which said questionnaire contents are to be distributed.

9. The questionnaire agency system according to claim 8, wherein said information retrieval unit chooses two or more answerers who meet said condition from said answerer information, and said distribution means chooses said first answerer from said two or more answerers randomly.

10. The questionnaire agency system according to claim 5, further comprising collection means for controlling said communication means to transfer a reply submitted to said questionnaire by said first answerer to the terminal of said first client.

11. The questionnaire agency system according to claim 10, wherein said communication means sends client information that is made to correspond with said first client to said terminal of said first answerer together with the contents of said questionnaire, and said collection means specifies said first client on the basis of said client information contained in a reply to said questionnaire from said first answerer.

12. The questionnaire agency system according to claim 10, wherein said communication means sends to said terminal of said first answerer a call number of a reception terminal to which a reply to said questionnaire is to be directed and which is made to correspond with said first client together with the contents of said questionnaire, and said collection means transfers a reply to said questionnaire received by said reception terminal to said terminal of said first client.

13. The questionnaire agency system according to claim 10, wherein said collection means determines whether the number of replies to said questionnaire sent from two or more answerers including said first answerer has reached a predetermined number and, when said predetermined number is reached, terminates collection of replies to said questionnaire.

14. The questionnaire agency system according to claim 10, wherein said collection means determines whether a period of a questionnaire reply has expired and terminates collection of replies to said questionnaire when the period has expired.

15. A questionnaire agency system which intermediates a questionnaire client and answerers each having a terminal connected to a network and conducting questionnaire for said client, comprising:

an information retrieval unit to automatically choose a first answerer that meets a condition specified by a first client from a plurality of answerers; and a communication unit to send the contents of a questionnaire of said first client to the terminal of said first answerer chosen by said information retrieval unit.

16. The questionnaire agency system according to claim 15, wherein:

said communication unit receives the contents of said questionnaire from the terminal of said first client and said information retrieval unit automatically chooses a call number of the terminal of said first answerer associated with said first client.

17. A questionnaire agency system which intermediates a questionnaire client and answerers each having a terminal connected to a network and conducting questionnaire for said client, comprising:

communication means for receiving a reply to a questionnaire of a first client from a first answerer who meets a condition specified by said first client, said first answerer being selected from among a plurality of answerers by retrieving a database storing individual information about said plurality of answerers; and collection means for controlling said communication means to transfer said reply to said questionnaire to the terminal of said first client.

18. A method of conducting questionnaire for a client comprising the steps of:

creating a database for storing answerer information containing individual information of a plurality of answerers;

entering a condition of an answerer specified by a first client;

retrieving a first answerer who meets said condition among said plurality of answerers; and choosing said first answerer as a receiver of a questionnaire of said first client.

19. The method according to claim 18, further comprising the step of examining a call number of a terminal of said first answerer and sending the contents of a questionnaire of said first client to the terminal of said first answerer using said call number of said first answerer.

20. The method according to claim 19, further comprising the step of transferring a reply to said questionnaire received from said terminal of said first answerer to a terminal of said first client.

21. A computer-readable storage medium, when used by a computer to conduct questionnaire for a client, used to direct the computer to perform the functions of:

creating a database for storing answerer information containing individual information of a plurality of answerers;

entering a condition of an answerer specified by a first client;

retrieving a first answerer who meets said condition among said plurality of answerers; and choosing said first answerer as a receiver of a questionnaire of said first client.

* * * * *